(12) United States Patent
Li et al.

(10) Patent No.: US 12,511,790 B2
(45) Date of Patent: Dec. 30, 2025

(54) GRAPH SIGNAL FREQUENCY-DOMAIN MOTION COMPENSATION FOR POINT CLOUD ATTRIBUTES CODING

(71) Applicant: Adeia Guides Inc., San Jose, CA (US)

(72) Inventors: Zhu Li, Overland Park, KS (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 371 days.

(21) Appl. No.: 18/084,074

(22) Filed: Dec. 19, 2022

(65) Prior Publication Data

US 2024/0202979 A1 Jun. 20, 2024

(51) Int. Cl.
*G06T 9/00* (2006.01)
*G06T 9/40* (2006.01)

(52) U.S. Cl.
CPC ............... *G06T 9/001* (2013.01); *G06T 9/40* (2013.01)

(58) Field of Classification Search
CPC .................... G06T 9/001; G06T 9/40
See application file for complete search history.

(56) References Cited

U.S. PATENT DOCUMENTS

2021/0166436 A1* 6/2021 Zhang .................. G06T 9/40

OTHER PUBLICATIONS

Pharr, Matt et al. "Physically based rendering: From theory to implementation", 3rd edition, section 4.4, published 2016 (Year: 2016).*

Thanou, Dorina et al. "Graph-based compression of dynamic 3D point cloud sequences." IEEE, published 2016 (Year: 2016).*
Xu, Yiqun, et al. "Predictive generalized graph Fourier transform for attribute compression of dynamic point clouds." IEEE, published Aug. 11, 2020 (Year: 2020).*
Iterative Closest Point library: https://pcl.readthedocs.io/projects/tutorials/en/latest/interactive_icp.html.
Li et al., "Occupancy-map-based Rate Distortion Optimization and Partition for Video-based Point Cloud Compression", IEEE Transactions on Circuits and Systems for Video Technology (T-CSVT), 2021.
R. Mekuria et. al., "Design, Implementation, and Evaluation of a Point Cloud Codec for Tele-Immersive Video", IEEE Transactions on Circuits and Systems for Video Technology T-CSVT, 2017.

(Continued)

*Primary Examiner* — Oneal R Mistry
*Assistant Examiner* — Nhut Huy Pham
(74) *Attorney, Agent, or Firm* — HALEY GUILIANO LLP

(57) ABSTRACT

Systems and methods are disclosed herein for temporally predictive coding of three-dimensional (3D) dynamic point cloud attributes. A first frame and a second frame of point cloud data are accessed. The point cloud data points include 3D spatial coordinates and one or more graphic attributes. A block tree data structure comprising a plurality of blocks is generated based on a tree partitioning of the second frame of point cloud data. Matching block pairs between the first frame and the second frame are identified from the plurality of blocks based on block-wise searching. Frequency-domain projections are generated for each matching block pair via a graph Fourier transform (GFT) algorithm. A bitstream of motion-compensated residuals is generated based on differences in the frequency-domain projections for each matching block pair.

20 Claims, 8 Drawing Sheets

(56) References Cited

OTHER PUBLICATIONS

Sebastian Schwarz, et al., Emerging MPEG Standards for Point Cloud Compression. IEEE J. Emerg. Sel. Topics Circuits Syst. 9(1): 133-148 (2019).

Kiaowen Dong et al., "Graph Signal Processing for Machine Learning: A Review and New Perspectives," IEEE Signal Process. Mag. 37(6): 117-127 (2020).

* cited by examiner

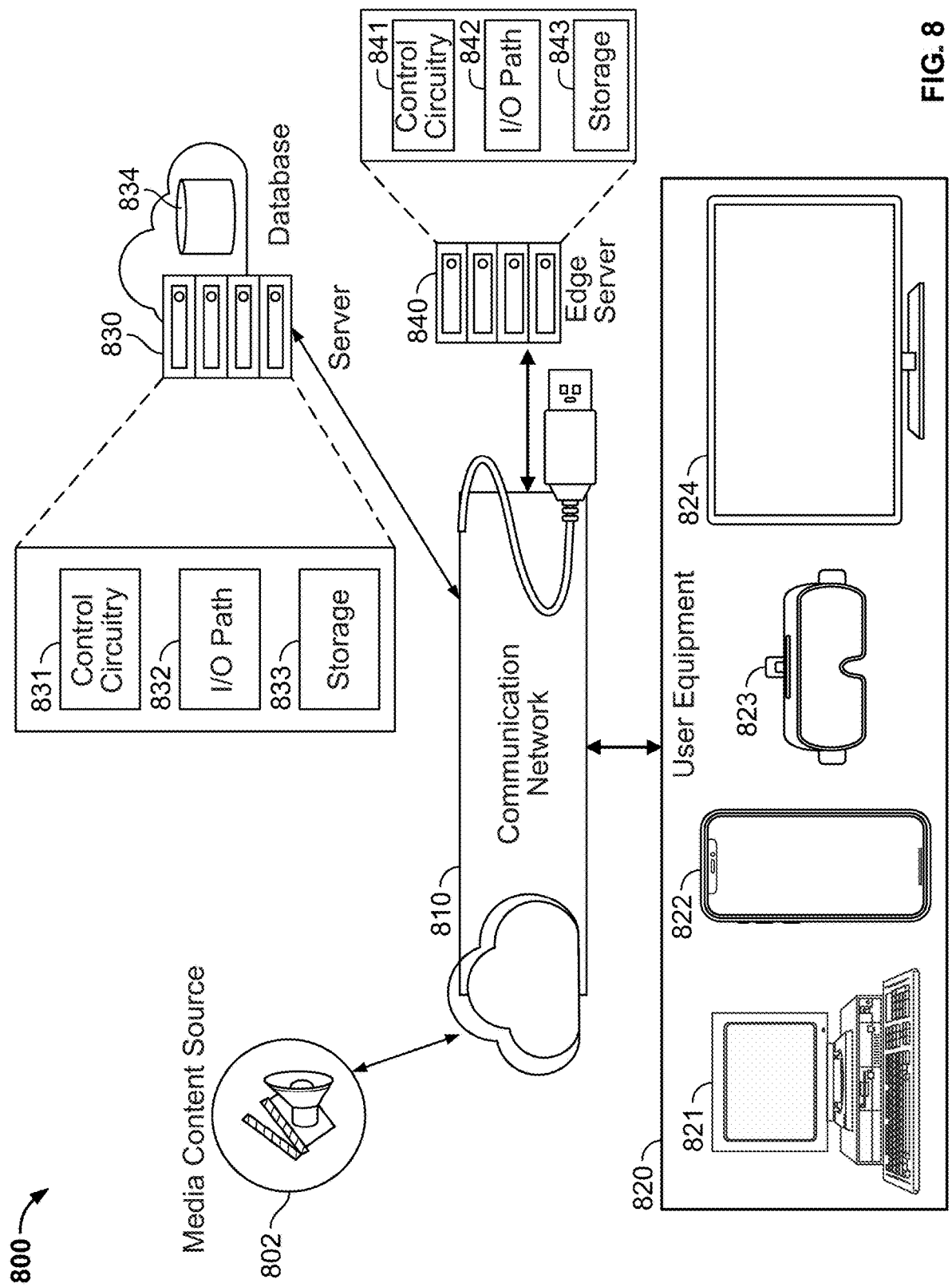

GRAPH SIGNAL FREQUENCY-DOMAIN MOTION COMPENSATION FOR POINT CLOUD ATTRIBUTES CODING

BACKGROUND

The present disclosure is generally directed to systems and methods for encoding extended reality (XR) content (e.g., metaverse-based, augmented reality (AR), virtual reality (VR), and mixed reality (MR)). In some embodiments, systems and methods are provided that allow for efficient temporal prediction in dynamic point cloud attribute coding.

SUMMARY

Dynamic point cloud compression (PCC) is a developing technology that may be used to enable a metaverse vision of immersive interactions with extended reality objects (e.g., natural and synthetic content). In some aspects, XR content may be referred to as four-dimensional (4D) content. In particular, temporally predictive coding (e.g., motion compensation) in dynamic PCC is a key challenge for 4D content encoding efficiency.

Conventional signal processing and compression tools (e.g., in video compression) are typically designed for a uniformly sampled signal. However, point cloud attribute data used in PCC is non-uniformly sampled, spatially and/or temporally. Current solutions for dynamic PCC include applying existing video-based compression techniques on two-dimensional (2D) projected patches (e.g., depth map, texture map, occupancy map, etc.) and motion prediction and compensation in the spatial-temporal domain. However, 2D-projected patches lose patch temporal coherence, resulting in the majority of the 2D patches being coded in intraframe mode and leaving conventional video-based techniques for motion compensation ineffective.

Further, direct 3D motion compensation in the temporal domain of a point cloud is inefficient partly due to the non-uniform sampling. For example, direct motion compensation in the temporal domain typically requires the same number of points between matching pairs of partitions in different frames. Alternatively, direct pointwise comparison between partitions may be applied but generally is prohibitively costly in computing power and time. Thus, direct 3D motion compensation in the spatial-temporal domain of a point cloud is largely unsuitable for the real-time processing scales needed, e.g., with metaverse-based content.

Accordingly, there is a need to develop an improved framework for dynamic point cloud attribute compression with efficient motion compensation.

To help address the aforementioned problems, systems and methods are provided herein having improved dynamic point cloud attribute compression based on graph signal processing (GSP) techniques. In some aspects of the present disclosure, a new framework that combines the advantages of spatial-domain motion prediction and frequency-domain motion compensation is described. Such a framework may be advantageous for encoding and reconstructing 3D virtual objects including AR/VR/MR content and in various applications related to a virtual environment such as a metaverse-based application. In some aspects, a two-stage motion compensation scheme is described herein that resolves the aforementioned issues in temporal-based motion compensation by combining the advantages of motion prediction in the spatial domain and motion compensation in the graph Fourier-transformed domain or the frequency domain.

In some embodiments, the encoder accesses a first frame of point cloud data and/or a second frame of point cloud data, where each data point comprises spatial coordinates (e.g., Cartesian coordinates) and various attributes (e.g., temporal attributes, graphic attributes, frame index, geometry, etc.) for graphic rendering and reconstruction. The encoder may generate a block tree data structure based on a tree partitioning of the point cloud data for a selected frame. For example, if the first frame is a reference frame and the second frame is a currently viewable or current frame, the encoder may partition the point cloud data of the current frame. Any suitable space-partitioning algorithm may be used. In some embodiments, a variable depth k-dimensional (k-d) tree partitioning is generated for enabling efficient multi-dimensional search and prediction, resulting in a plurality of blocks partitioning the occupied space.

The encoder may perform motion prediction for the point cloud as a first stage of the motion compensation scheme. In some embodiments, an iterative search and/or comparison is performed to identify the group of points and corresponding partitions that have moved between the first frame and the second frame. For example, corresponding partition pairs may be identified via a partition-wise iterative closest point (ICP) search that may include determining a point cloud transform. For example, performing the ICP search may determine the translation between the corresponding points and identify block pairs that match the points. Optionally, the application may determine a rotation between the matching block pairs.

Direct motion compensation may have a high processing complexity involving a pointwise correspondence process after identifying the partition pairs. The high computing cost leaves direct motion compensation unsuitable for processing 4D content in XR applications. Rather, as a second stage of the motion compensation scheme, a frequency-domain representation applicable for a matching partition pair may be generated. For example, the encoder, via the GFT algorithm, may generate a frequency transform of a partition based on the distances between each point contained in the partition. For example, the ICP search may have determined, based on a point cloud translation between frames, that a block of the second frame corresponds to a group of points of the first frame. The encoder may generate a frequency representation of the block via a graph Fourier transform (GFT) algorithm. The representation may be applied for projecting the corresponding points to the frequency domain. The encoder may determine the differences based on the projected group of points in the frequency domain.

In some embodiments, the partitioning may result in each block having the same number of points. The encoder may determine the differences without generating additional signal samples in the frequency domain. Advantageously, the frequency-domain representation comprises the compressed point cloud attributes and may be used to generate a 1D frequency-based model of the signal. For example, a parametrization may be generated that models the signal response in the frequency domain. The parametrization may enable a non-uniform sampling of the signal response in the frequency domain, and any number of sampling points may be generated. For example, the motion between matching partitions may be efficiently computed and compensated without requiring the same number of points between partitions in the spatial domain. In some embodiments, a parametrization (e.g., polynomial-based) may be generated corresponding to the frequency representation of a block in the current frame. The encoder may determine differences based on the parametrization, e.g., by generating the signal using a polynomial parametrization based on additional sampling in the frequency domain.

The encoder may determine the differences between each matching partition pair based on their projections in the frequency domain. In some embodiments, the encoder generates a plurality of residuals by determining the differences between each matching pair of partitions in the frequency domain. The residuals in the frequency domain may represent the motion between frames in the spatial-temporal domain. Thus, the motion can be compensated for representations in the frequency domain efficiently relative to direct compensation in the spatial-temporal domain. In some embodiments, the encoder may generate a bitstream of motion-compensated residuals based on the differences in the frequency-domain representations for each matching partition pair. In some aspects, the encoder generates the bitstream of motion-compensated residuals in an inter coding mode via the aforementioned process.

In some aspects, the dynamic point cloud attribute coding framework described herein produces a bitstream having a high prediction efficiency. For example, the bitstream may include the information for reconstructing the motion of 4D content. Frequency-based motion compensation is advantageous over the temporal-based motion compensation by transforming or projecting the point cloud attributes to a frequency domain (or a spectral domain in general). In some aspects, the dynamic point cloud attribute coding framework may compress a partition of point cloud attribute data to a bitstream within the current frame that requires fewer bits or less memory. In particular, the improved framework may generate a bitstream having a smaller amount of data than temporal-based motion compensation while maintaining critical information (e.g., temporal coherence), resulting in more efficient transfers, lower memory usage, and reduced processing times.

As a result of the described systems and techniques, XR content such as in metaverse-based applications may be efficiently encoded including motion compensation to generate a bitstream for reconstruction.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 8 shows an illustrative system for consuming media content, in accordance with some embodiments of this disclosure.

DETAILED DESCRIPTION

Figure 1:
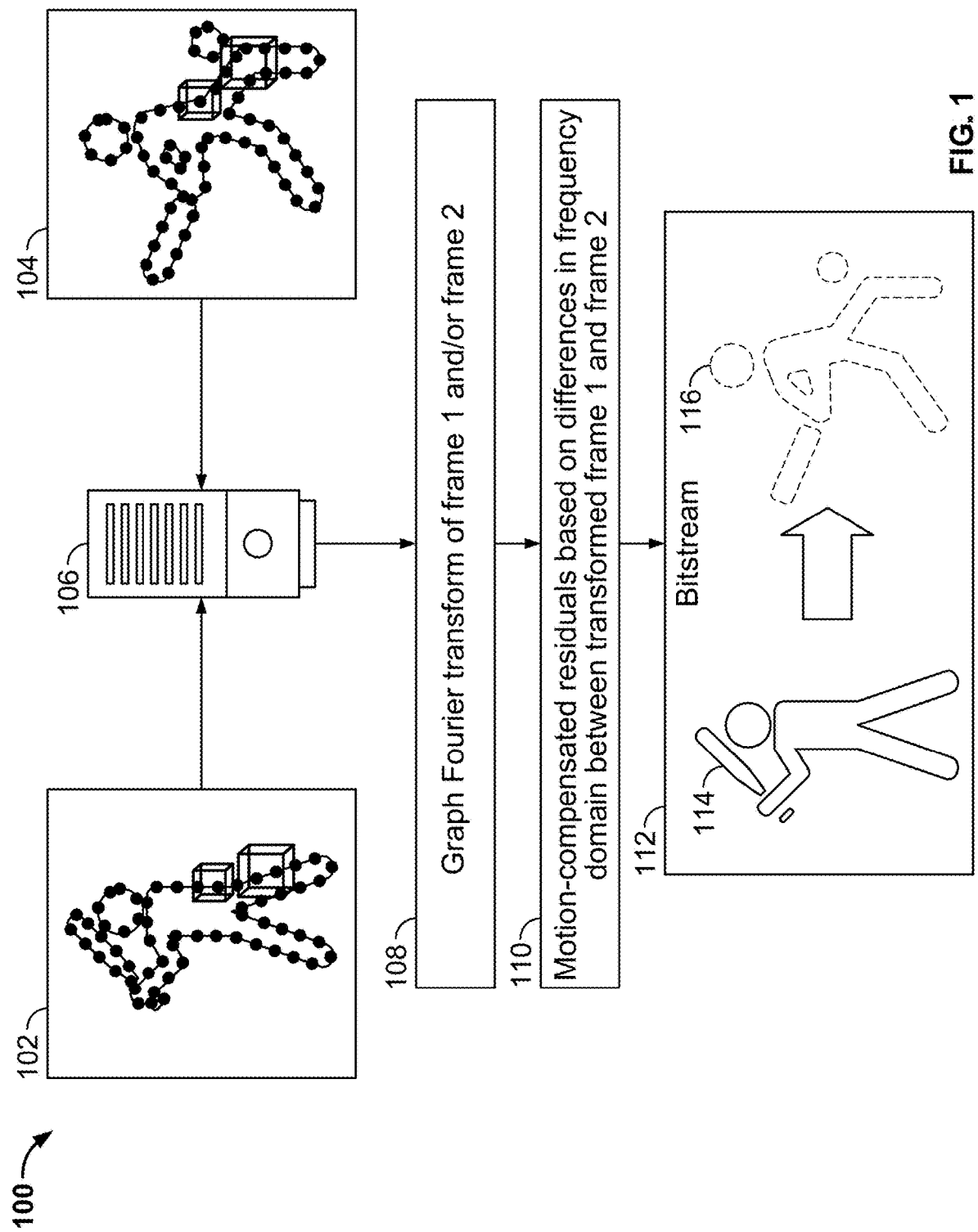
FIG. 1 shows an illustrative system for encoding extended reality content with motion compensation, in accordance with some embodiments of this disclosure.

Systems and methods are described herein for an encoding application providing temporally predictive coding of dynamic point cloud attributes.

As referred to herein, the term "content" should be understood to mean an electronically consumable asset accessed using any suitable electronic platform, such as broadcast television programming, pay-per-view programs, on-demand programs (as in video-on-demand (VOD) systems), Internet content (e.g., streaming content, downloadable content, Webcasts, etc.), video clips, audio, information about content, images, animations, documents, playlists, websites and webpages, articles, books, electronic books, blogs, chat sessions, social media, software applications, games, virtual reality media, augmented reality media, and/or any other media or multimedia and/or any combination thereof. In particular, extended reality (XR) content refers to augmented reality (AR) content, virtual reality (VR) content, mixed or hybrid reality (MR) content, and/or other digital content combined with or to mirror the physical world objects including interactions with such content.

As referred to herein, compression and/or encoding of media content may be understood as any suitable combination of hardware and/or software configured to perform bit reduction techniques on digital bits of the media content in order to reduce the amount of data required to transmit and/or store the media content. Such techniques may reduce the bandwidth or network resources required to transmit the media content over a network or other suitable wireless or wired communication medium and/or enable bitrate savings with respect to downloading or uploading the media content. Such techniques may encode the media content such that the encoded media content may be represented with fewer digital bits than the original representation while minimizing the impact of the encoding or compression on the quality of the media content. In some embodiments, parts of encoding the media content may include employing a hybrid video coder such as, for example, the High Efficiency Video Coding (HEVC) H.265 standard, the Versatile Video Coding (VVC) H.266 standard, the H.264 standard, the H.263 standard, MPEG-4, MPEG-2, or any other suitable codec or standard, or any combination thereof.

While a point cloud and its associated data may represent 3D objects herein, it is noted and appreciated that a point cloud may refer to any set of data points that is suitable for graphics rendering and reconstruction (e.g., surface reconstruction in XR applications). A frame as used herein refers to the point of view of a user in an XR environment (e.g., the viewable portion via a head-mounted display (HMD)) at a particular time point. For example, in an XR context, a frame may refer to parts and surfaces of a virtual avatar that are currently viewable by a user through the user's display device. A frame may contain or be associated with a point cloud set (or a combination of point clouds of separate multiple objects) suitable for reconstructing the viewable parts and/or surfaces. Additional portions of a point cloud outside the user's point of view may be cached, for example, for efficiently reconstructing viewable objects and surfaces as the user's point of view moves in the XR environment.

FIG. 1 shows an illustrative system 100 for encoding extended reality content with motion compensation, in accordance with some embodiments of this disclosure. The system 100 may include an encoder 106 (e.g., comprising associated circuitry) for encoding frame 102 and/or frame 104 having associated point cloud data. The encoder 106 may determine a tree partitioning for the point cloud data of frame 104 and generate a suitable data structure for the tree partitioning. Matching partition pairs and their respective predicted motion may be identified based on the tree partitioning, for example, via an iterative closest point (ICP) technique. The encoder 106 may generate spectral or frequency-based representations 108 of each matching partition pair having a predicted motion, for example, via a graph Fourier transform (GFT) technique. When compared in the graph Fourier-transformed domain or frequency domain, the differences between a pair of partitions may be determined. The encoder 106 may generate motion-compensated residuals 110 based on the determined differences in the frequency domain for the matching partition pairs. In some embodiments, the encoder 106 may generate a bitstream 112 using the motion-compensated residuals 110. Processing based on the bitstream 112 may result in an encoded motion-compensation frame 116 based on a reference frame 114 such as frame 104. As an illustrative example, frame 104 may be a currently viewable frame, and frame 102 may be a reference frame (e.g., before or after frame 104). Frame 102 may exhibit a virtual avatar in an at-bat position and contain the associated point cloud data. Frame 104 may exhibit the virtual avatar having moved to a position preparing to hit a ball with the bat and contain the associated point cloud data.

The encoder 106 (and associated circuitry) may access point cloud data representing one or more objects in motion, where each data point comprises spatial coordinates (e.g., Cartesian coordinates) and various attributes (e.g., temporal attributes, graphic attributes, frame index, geometry, etc.). The point cloud data may represent samples of the object's signal, for example, in an XR environment. In some embodiments, the encoder 106 may access the associated point cloud data, which is provided in a suitable format. In some aspects, point cloud data may comprise a set of data points represented in a spatial domain. Each data point includes spatial coordinates and may include associated attributes for graphic rendering and reconstruction. Some example graphic attributes may include additive color components, subtractive color components, chrominance components, and/or luminance components. The point cloud data may be suitable for reconstructing the viewable surfaces of one or more real, virtual, and/or hybrid objects. In some embodiments, the point cloud data represents an object as a combination of a physical object overlaid by virtual content (e.g., AR content). For example, a point cloud data set may be produced by 3D scanning a physical object. In another example, generating a point cloud data set may involve photogrammetry techniques or scan matching.

The space occupied by the point cloud may be organized into a partition data structure having a plurality of non-overlapping spatial partitions generated using a suitable space partitioning technique. In some embodiments, frame 102 and/or frame 104 of the point cloud data are decomposed using a tree partitioning technique. The tree partitioning may generate a block-like structure over the point cloud space. For example, encoder 106 may partition frame 104, where frame 104 is a current frame. In some aspects, point cloud decomposition via a tree partitioning, such as a variable depth k-dimensional (k-d) tree partitioning, organizes the points (total number N) as a tree structure (e.g., a binary tree) comprising a plurality of leaf node blocks. In some embodiments, the frame 104 may be partitioned as a k-d tree structure to a suitable depth (denoted L), for example, such that each block of the tree structure contains about $N/(2^L)$ points. The frames 102 and 104 show some example partitions as cubes. It is contemplated that other suitable geometries (e.g., honeycomb, hexagonal, other polyhedra, etc.) may be used to generate a tessellation over the occupied point cloud space. A partition organization and corresponding data structure may be generated and applied in combination with the teachings of the present disclosure.

The encoder 106 may generate the partitioned structure or portions thereof. Additionally, or alternatively, the partitioned structure or portions thereof may be generated by a second system coupled to encoder 106 (within system 100 or remotely via a server). The partitioning may be provided to encoder 106 for processing. In some embodiments, adaptive partitioning techniques may be applied when generating the partitioned data structure such that each partition has the same number of points. For example, each partition may have different sizes, and the population of each partition may be about the same via the adaptive partitioning. In some embodiments, the adaptive partitioning may be performed such that the population of each partition does not exceed a maximum number of points. In some embodiments, the point cloud space may be adaptively partitioned such that one or more criteria related to a partition's population are met. The partitioning may result in a data structure enabling efficient multi-dimensional search and motion prediction, for example, as in a variable depth k-d tree partitioning.

The encoder 106 may perform a partition-wise search to determine the changes in the point cloud for generating an object's predicted motion. In some embodiments, the encoder 106 identifies matching groups of points or partition pairs between frame 102 and frame 104 based on partition-wise searching. For example, each data point of a point cloud and/or each partition may be associated with a respective identifier. A partition-wise search may involve comparing the identifiers to identify corresponding pairs between frames. As another non-limiting example, the encoder 106 may identify the matching block pairs using an iterative closest point (ICP) technique (e.g., by executing an ICP algorithm) or another suitable technique for identifying pairs having a predicted motion. It is noted that ICP is provided herein for illustrative purposes and is not intended to be limiting. Some examples of suitable techniques may include techniques used in point-cloud registration, feature matching, graph matching, etc. The ICP search may include determining a point cloud transform. In some embodiments, the point cloud transform may be used to identify corresponding pairs and predict the point cloud motion. For example, one or more points of the point cloud may have changed positions. The changes in position may be described as a spatial transform (translation and/or optional rotation) of a first point cloud starting from a first frame such as a current frame. The spatial transform of the point cloud may be determined such that the transformed point cloud matches the point cloud from a second frame, such as a reference frame. Respective partitions of the first frame containing the moved points may be identified based on the spatial transform. For example, if a first point of the current frame matches a second point of the reference frame after a translation of the point cloud, then the partition containing the first point may be associated with the second point and identified as a matching partition pair.

Frames 102 and 104 may include respective point cloud data sets. The point cloud data of frame 104 may have been partitioned such that a first block of the point cloud includes a first group of points. As part of a partition-wise search, a second group of points in frame 102 may be identified as a nearest match for the first point group using the ICP technique to minimize an error metric based on distance. The encoder 106 may determine the predicted motion based on the identified pairs. In some embodiments, the encoder 106 may determine translation and/or rotation between matching partition pairs via the ICP search. In some embodiments, a trajectory may be determined that represents a curve traced by the motion of the point cloud or at least portions thereof. For example, the translation or trajectory may be used in predicting the point cloud motion between a current frame and a reference, represented as a vector or other suitable data structure for the change in position X (denoted $\Delta X = X_2 - X_1$) of a point group in a block of a second frame relative to the matching point group in a first frame. For example, frame 104 may be the currently viewable frame having a first partition. The first partition may have an associated translation vector $\Delta X = (0.1, 0.05, 0.02)$ relative to a corresponding group of points in a reference frame such as frame 102. The translation vector may indicate a predicted motion of the first partition that resulted in shifting the points to or from the positions in the reference frame. The encoder 106 may identify a plurality of matching partition pairs with each pair having a predicted motion, for example, such that a partition that starts at a first position in a reference frame will transition to a second position in the current frame or vice versa.

In some embodiments, a frequency-domain representation applicable for a matching partition pair may be generated. The encoder 106 may determine a representation for a matching pair of partitions in the frequency domain. In some embodiments, the encoder 106 may generate frequency-domain representations for each matching partition pair having sufficient differences. A matching partition pair that does not have differences in one or more graphic attributes exceeding a threshold may be determined without generating a frequency-domain representation. For example, frame 104 may be the current frame having a first partition and a second partition. The first partition may have a predicted motion based on a matching partition from frame 102. The second partition may present insignificant differences based on its matching partition from frame 102 (e.g., relative differences having a magnitude less than $10^{-1}$). In this example, the encoder 106 may generate a frequency-domain representation for the first partition and not the second partition to improve coding efficiency. For example, when the residual for the second partition corresponding to the differences in the other point attributes such as graphic attributes are nonzero and exceed a threshold, the encoder 106 may process the residual of the second partition in the same manner as a residual of the first partition.

In some embodiments, the frequency-domain representation of a partition (e.g., one of a partition pair) may be transformed to the frequency domain based on the geometric affinity of points in the partition. For example, the ICP search may have determined, based on a point cloud translation between frames, that a block of the second frame corresponds to a group of points of the first frame. The encoder generates a frequency representation of the block via a graph Fourier transform (GFT) algorithm. The representation may be applied for projecting the corresponding points to the frequency domain. The encoder may determine the differences based on the projected group of points in the frequency domain. In some embodiments, a parametrization (e.g., polynomial-based) may be generated corresponding to the frequency representation of a block in the current frame. The encoder may determine differences based on the polynomial parametrization, e.g., by generating signal sampling points in the frequency domain.

An illustrative example is described in the following paragraphs involving graph signal processing (GSP) techniques, but other suitable signal processing techniques may be added and/or substituted. In some embodiments, the encoder 106 may generate a frequency transform based on the affinity of points in a partition. For example, a partition may contain N points, each having three spatial coordinates and/or associated attributes (e.g., a luminance value). The coordinates may be represented as a N-x-3 matrix X. The affinity S and degree D may be computed as a distance-based function between any two points in the partition scaled by a factor h and represented as matrices having the following matrix elements:

$$S_{j,k} = e^{\frac{dist(x_j, x_k)}{h}}$$

$$D_{i,i} = \sum_k S_{i,k}$$

The value for the factor h may be set to one in some embodiments, but it is contemplated that h may have any value depending on the implementation without departing from the teaching of the present disclosure. The GFT matrix A having frequency eigenvalues f may be computed by solving an eigen problem of the matrix D–S (referred to as the Laplacian matrix), denoted by the following equation:

$$[A, f] = eig(D - S)$$

In some aspects, the transform matrix A projects the point attributes for the partition to a frequency domain where the signal in the frequency domain is sampled at a plurality of frequency locations having values f. The values f may be eigenvalues resulting from solving the Laplacian eigen problem. For example, a frequency-domain representation Z for the partition may be computed by transforming the coordinates based on the following formula:

$$Z = AX$$

The transform matrix A may be computed based on either partition of a matching pair and would be applied as a valid transformation to the other partition of the matching pair. For example, encoder 106 may generate a frequency-domain transformation based on the affinity of points in a partition of frame 104. The same frequency-domain transformation may be applied to the points in a matching partition of frame 102 without solving the eigen problem again. The frequency eigenvalues may be non-uniformly sampled. By generating the transformation, the signals for matched partition pairs of different frames may be represented in the frequency domain. In some aspects, the spatial coordinates of the signals are compressed to a one-dimensional (1D) frequency space and may be suitably processed, in particular, for determining motion compensation using the residuals. For example, a polynomial-based parametrization of the signal in the frequency domain may be generated based on the signal response at the frequency eigenvalues (e.g., using 1D interpolation techniques). In some aspects, the parametrization enables determining a frequency-based model representing the point cloud signal of a partition and may be advantageous for determining the differences between points corresponding to the partition since the model may be analyzed or applied to generate additional sampling of the signal in the frequency domain. The number of points in each partition can be different, and the signal sampling can be non-uniform. Thus, frequency-based point cloud attribute coding may be suitable for XR or metaverse applications and associated content over conventional methods.

The encoder 106 may determine the differences in the frequency domain for a matching partition pair. In some embodiments, the encoder 106 determines a plurality of residuals based on a transformed matching partition pair. For example, points $X_1$ contained in a partition of frame 104 and points $X_2$ contained in a matching partition of frame 102 may be transformed as $Z_1=AX_1$, $Z_2=AX_2$. Then, a residual in the frequency domain may be computed as follows:

$$R(f) = Z_2(f) - Z_1(f)$$

For example, the residual may be sampled at the plurality of frequency locations obtained by solving the eigen problem for a current frame. In some embodiments, the encoder 106 may generate a plurality of residuals corresponding to the matched partition pairs having a predicted motion. The residuals may be processed for generating a bitstream suitable for reconstruction (e.g., in XR applications). As part of generating the bitstream, the residuals may be quantized and entropy coded using suitable data compression techniques (e.g., Huffman coding, arithmetic coding, context-adaptive binary arithmetic coding (CABAC), universal coding algorithms, etc.). In some embodiments, the encoder 106 generates a bitstream 112 of motion-compensated residuals 110 based on the differences between matching partition pairs in the frequency domain. Thus, an object's motion (e.g., as viewed in an XR environment) may be efficiently reconstructed based on the bitstream 112 generated using the point cloud data. Frame 116 shows an illustrative example of the determined motion compensation starting from an initial position shown in frame 114.

Each data point of the point cloud data may include associated graphic attributes. The graphic attributes may be carried over without applying the transform matrix. In some embodiments, the encoder 106 may determine the differences in one or more of the graphic attributes for matching partition pairs as part of generating the bitstream. For example, color components such as RGB or YUV may have changed for one or more points in a partition pair. The encoder 106 may compensate for the change in the color components parallel to determining the motion compensation and include the color compensation in the residuals. The encoder 106 may generate a bitstream based on the residuals that include the color compensation.

In some embodiments, the encoder 106 may determine one or more weighted averages of matching partition pairs based on a plurality of reference frames having point cloud data. For example, a first partition may be from a first reference frame, referred to as a reference partition. The reference partition may comprise a weighted average of matching partitions from a plurality of reference frames or of a plurality of matching partitions from the same reference frame. For example, a partition-wise search (e.g., using ICP) may identify reference partitions from a plurality of reference frames that match the first reference partition. After the spatial-domain motion prediction, inter coding compensation may be performed in the frequency (or GFT) domain for the matching partitions to generate a weighted average of the matching partitions, referred to as a weighted partition. In some embodiments, the weighted partition may be encoded for motion prediction and motion compensation using any of the techniques described herein. For example, a frequency representation may be generated for a weighted partition that is selected as one of a partition pair identified from a first frame and a second frame. The encoder 106 may generate a bitstream from a residual based on the difference determined using the weighted partition in the frequency domain. In some embodiments, the weighting may depend on a degree of difference between the frames in the temporal domain. For example, the weighting may depend on the distance between frames. As a second example, the weighting may depend on a similarity factor determined via an ICP search. The weights of a partition may be implicitly or explicitly signaled in a generated bitstream. A weighted reference partition may be advantageous for applying in a bi-directional context, for example, in an XR application.

Figure 2:
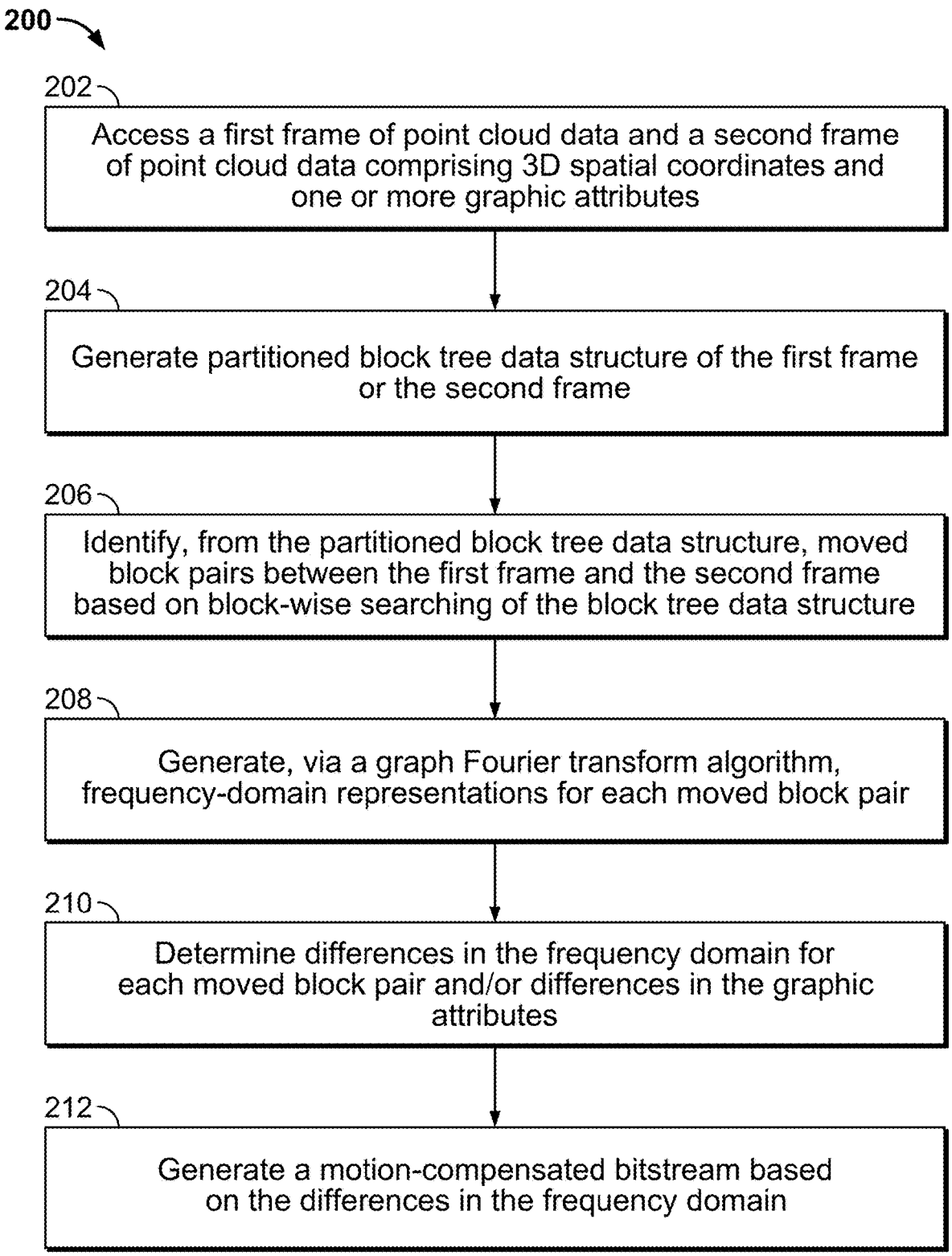
FIG. 2 is a flow diagram of an illustrative process for encoding extended reality content with motion compensation, in accordance with some embodiments of this disclosure.

FIG. 2 is a flow diagram of an illustrative process 200 for encoding extended reality content with motion compensation, in accordance with some embodiments of this disclosure. The following paragraphs may refer to partitions as blocks as an illustrative example and is intended to be non-limiting. Process 200 may include accessing point cloud data for a first frame and a second frame, generating a block tree data structure partitioning the point cloud data for the first frame and/or the second frame, identifying matching block pairs having a predicted motion between the first frame and the second frame via a block-wise search. For each identified block pair, the process may include generating a frequency-domain representation for at least one block of the respective pair and determining the differences in the frequency domain. For example, a plurality of motion-compensated residuals may be generated from the determined differences. In some embodiments, differences in the associated attributes (e.g., graphic attributes) may be determined for the identified block pairs. The process may include generating a bitstream based on the determined differences, for example, using the motion-compensated residuals. The bitstream may be suitable for object reconstruction in an XR application. One or more steps of process 200 may be executed via associated circuitry such as a control circuitry coupled to the encoder 106.

At 202, the control circuitry may access and/or retrieve the point cloud data for a first frame and a second frame. For example, the point cloud data may be stored locally or remotely (e.g., on a server in the cloud). In some embodiments, the control circuitry accesses point cloud data for a plurality of assets. The assets may form an XR environment (e.g., virtual objects, a physical object overlay or extension, etc.). The assets may collectively form one object in some implementations. Each asset may have associated point cloud data. The control circuitry may process each asset sequentially or in parallel. The point cloud data may have been generated using suitable digitization techniques involved in visualizing 3D objects and surfaces (e.g., 3D scanning, photogrammetry, computed tomography, structured light, LiDAR, time of flight scanning, point set registration, etc.). Each data point of the point cloud data may include spatial coordinates X and associated attributes such as one or more graphic attributes. For example, a group of points may have associated values including luminance, brightness, contrast, etc., used for rendering an object's surface shading.

At 204, the control circuitry may generate a block tree data structure using a tree partitioning of the point cloud space from the first frame and/or the second frame. For example, if the second frame is a current frame, the control circuitry may generate the block tree data structure based on a tree partitioning of the point cloud data associated with the second frame. The point cloud data may be organized into a plurality of nodes of the block tree data structure based on the tree partitioning. In some embodiments, the tree partitioning is performed for the space occupied by the point cloud. For example, the control circuitry may determine the dimensions describing the space occupied by all of the point cloud data. The control circuitry may determine the ranges of the occupied space using a suitable coordinate system. As an illustrative example, the point cloud space may be partitioned using a plurality of cubes, for example, described using a Cartesian coordinate system (x,y,z). The ranges may be the minimum and maximum values for each dimension x, y, and z. The space may be partitioned using any geometry that divides the occupied space into non-overlapping regions. For example, the control circuitry may generate a plurality of hexagonal prisms, forming a honeycomb-like structure. Some example data structures include binary space-partitioning trees, k-d trees, R-trees, etc. In some aspects, the organization of the block tree data structure may improve efficiency of structural queries including block intersections, range search, nearest neighbor search, point set registration, and/or balancing.

At 206, the control circuitry may identify pairs of matching blocks between the first frame and the second frame based on the block tree data structure. In some embodiments, the control circuitry performs a block-wise search and comparison to identify a group of points of a first frame matching a group of points in a block of the second frame. In some embodiments, the control circuitry may execute a suitable block matching algorithm for identifying corresponding blocks. Some examples of block matching algorithms include adaptive rood pattern search, Diamond Search, Four Step Search, etc. For example, a block in a current frame may be associated and/or identified by a block center. The control circuitry may search the nearest points of the reference frame based on the block center of a block in the current frame.

In some embodiments, the control circuitry may determine a spatial transform of a first point cloud of a first frame such that the transformed point cloud aligns with a second point cloud of a second frame. The control circuitry may identify blocks corresponding to each point based on the spatial transform. Additionally, or alternatively, the control circuitry may determine a spatial transform of a first point group or point cloud portion of a first frame such that the transformed first point group aligns with a point group in a block of a second frame. For example, the control circuitry may determine a position change and/or rotation that minimizes an error metric based on distance between points of the first point group and the second point group. For example, the control circuitry may determine a shape constructed by interconnecting points of the first point group and may determine a scaling factor such that the difference in the shape and the second point group is decreased.

In some embodiments, the control circuitry iteratively determines a spatial transform comprising a spatial translation such that the translated first point cloud or portion aligns with the second point cloud or portion. As an illustrative example, the control circuitry may determine a spatial transform using an ICP algorithm. A first point cloud may be designated as an initial guess. A second point cloud may be designated as a reference or target result. The control circuitry may iteratively revise a transformation of the first point cloud (translation, rotation, and/or scaling) to minimize an error function, for example, based on the distance between spatial coordinates of the first and the second point clouds. Based on the transformation, the control circuitry may identify a block of the first frame that corresponds to a point cloud portion of the second frame. In some embodiments, the control circuitry may identify pairs of matching blocks based on the point cloud transformation. Additionally, the pairs having a predicted motion may be identified based on the point cloud transformation. For example, points may have a predicted motion if the corresponding spatial transform comprises a nonzero translation and/or rotation.

In some embodiments, the spatial transform may comprise a plurality of transforms corresponding to a plurality of point cloud portions. For example, an object in a virtual environment may have a plurality of object parts, each part having an associated point cloud or portions of a point cloud. The control circuitry may determine a point cloud transform for each object part such that the associated point cloud of a part in a first frame is aligned with the part in a second frame. The control circuitry may apply the described systems and techniques herein using the plurality of transforms without departing from the teachings of the present disclosure.

At 208, the control circuitry may generate frequency-domain representations corresponding to the matching block pairs. In some embodiments, the control circuitry may generate the frequency-domain representations by executing a graph Fourier transform algorithm. For example, the control circuitry may determine the affinity for points in a block of the pair by constructing the Laplacian matrix as described regarding FIG. 1. The control circuitry may generate a frequency transform based on determining the eigenvectors and eigenvalues of the Laplacian matrix. The control circuitry may determine a mapping of each point corresponding to the partition based on the frequency transform. In some embodiments, the control circuitry may determine a frequency-based parametrization of the point cloud signal in the block based on the response sampled at the eigenvalues calculated for the block. The control circuitry may generate signal response samples in the frequency domain based on the parametrization.

At 210, the control circuitry may determine differences in the frequency domain for each matching block pair. In some embodiments, the control circuitry may determine differences in the associated graphic attributes. For example, the differences may be computed based on the parametrization in the frequency domain. In some embodiments, the control circuitry generates a plurality of motion-compensated residuals representing the differences for each block pair having a predicted motion. In some aspects, the residuals may represent an estimated motion of the point cloud. The residuals may be efficiently compressed and encoded relative to the point cloud data.

At 212, the control circuitry may generate a bitstream (e.g., bitstream 112) based on the plurality of residuals suitable for reconstructing a motion-compensated model for an object (e.g., shown in frame 116). In some embodiments, the control circuitry may quantize and/or entropy code the residual in the frequency domain for generating the bitstream for reconstruction. Additionally, the residual may comprise the differences of the point cloud attributes (e.g., RGB or YUV components). In some embodiments, where a block is a weighted average of blocks from multiple reference frames, the control circuitry may generate the bitstream to include an indicator for the weights.

Figure 3:
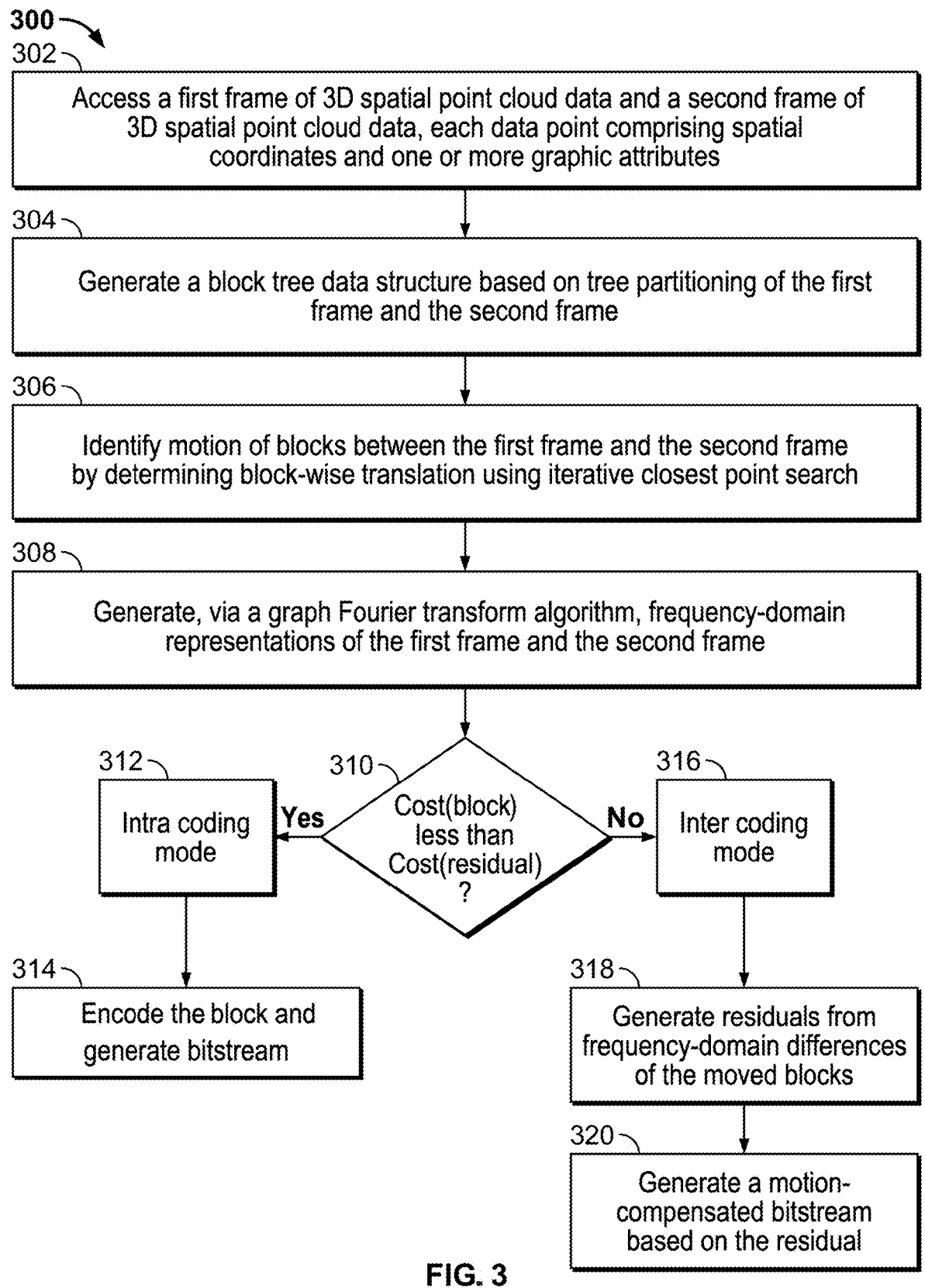
FIG. 3 is a flow diagram of an illustrative process for encoding extended reality content in intra coding mode or inter coding mode, in accordance with some embodiments of this disclosure.

In some aspects, the blocks are processed in an inter coding mode involving generating and encoding the residuals. The inter coding mode may be advantageous for motion estimation of a point cloud with high complexity. In some embodiments, an encoding cost may be compared for each block of a frame to determine whether the inter coding mode or an intra coding mode is selected, where the intra coding mode encodes a block in the current frame instead of the residual for the corresponding block pair. FIG. 3 is a flow diagram of an illustrative process 300 for encoding extended reality content in an intra coding mode or inter coding mode, in accordance with some embodiments of this disclosure. At 302, the control circuitry may access the point cloud data for a first and a second frame. At 304, the control circuitry may generate a block tree data structure based on a tree partitioning of the point cloud data for a selected frame (e.g., the current frame). At 306, the control circuitry may determine the matching block pairs having a predicted motion via an ICP search. At 308, the control circuitry may generate a frequency projection for each block of the selected frame having a predicted motion.

In some embodiments, the control circuitry may determine whether to select an inter coding mode or an intra coding mode. The evaluation may be performed for each block of the selected frame. For example, an encoding cost of each block of the selected frame may be compared to the encoding cost of the residual in the frequency domain. In some aspects, the encoding cost may be higher as the amount of data complexity increases. For example, the encoding cost of the signal in the frequency domain for a current block may be less than the encoding cost for a residual if the signal has a low complexity (e.g., sparsely populated or low amount of detail in the block). For example, the signal encoding cost may be small when a point cloud portion in a block has a small number of points. At 310, the control circuitry may determine whether the encoding cost for a block of a current frame is less than the encoding cost of a residual for the block. For example, the control circuitry may determine that the signal response variation or the average signal response of a block in the frequency domain is sufficiently small such that the encoding cost would be less than encoding the residual. The control circuitry may compare the encoding cost for each matching block pair and generate an indicator (e.g., a flag) for the coding mode. For example, the control circuitry may select an inter coding mode for a first plurality of the matching block pairs and an intra coding mode for a second plurality of the matching block pairs based on the encoding cost comparison. In some embodiments, the control circuitry may switch from an inter coding mode to an intra coding mode or vice versa for a block based on the encoding cost comparison.

If the intra coding mode is selected, process 300 may continue to 312. At 312, the control circuitry may determine to encode one or more blocks in an intra coding mode. In some aspects, intra coding mode may improve coding efficiency when the signal for the block in the frequency domain is near zero or has little variation. For example, a block at the periphery of a point cloud may be sparsely populated and/or the corresponding point cloud portion exhibits low complexity such as a flat plane. For such a block, the signal in the frequency domain may be small (e.g., having sample values near zero). Since encoding the frequency representation of the block may have a lower cost than the residual, the control circuitry may encode the frequency representation instead of a residual for generating a bitstream. For example, the control circuitry may quantize and entropy code the frequency representation for a block in the intra coding mode. At 314, the control circuitry may generate the bitstream based on the intra coded block.

If the inter coding mode is selected, process 300 may continue to 316. At 316, the control circuitry may select an inter coding mode for the block. For each block in an inter coding mode, the control circuitry may execute similar processes when generating the residuals described with respect to FIGS. 1-2. At 318, the control circuitry may determine the frequency-domain differences of the point cloud signal for each block and generate a respective residual. A plurality of motion-compensated residuals may be generated corresponding to a plurality of inter coded blocks. At 320, the control circuitry may generate a bitstream based on the plurality of residuals (e.g., by quantizing and coding the residuals).

In some embodiments, one or more frequency representations of intra coded blocks may be included along with residuals of inter coded blocks. The control circuitry may process the frequency representations (denoted Z) and the residuals (denoted R) to generate the bitstream including quantizing and coding (e.g., arithmetic, entropy, etc.). For example, the control circuitry may quantize and code a single data structure comprising a first plurality of Z and a second plurality of R rather than quantizing and coding separate data structures for Z and R.

Figure 4:
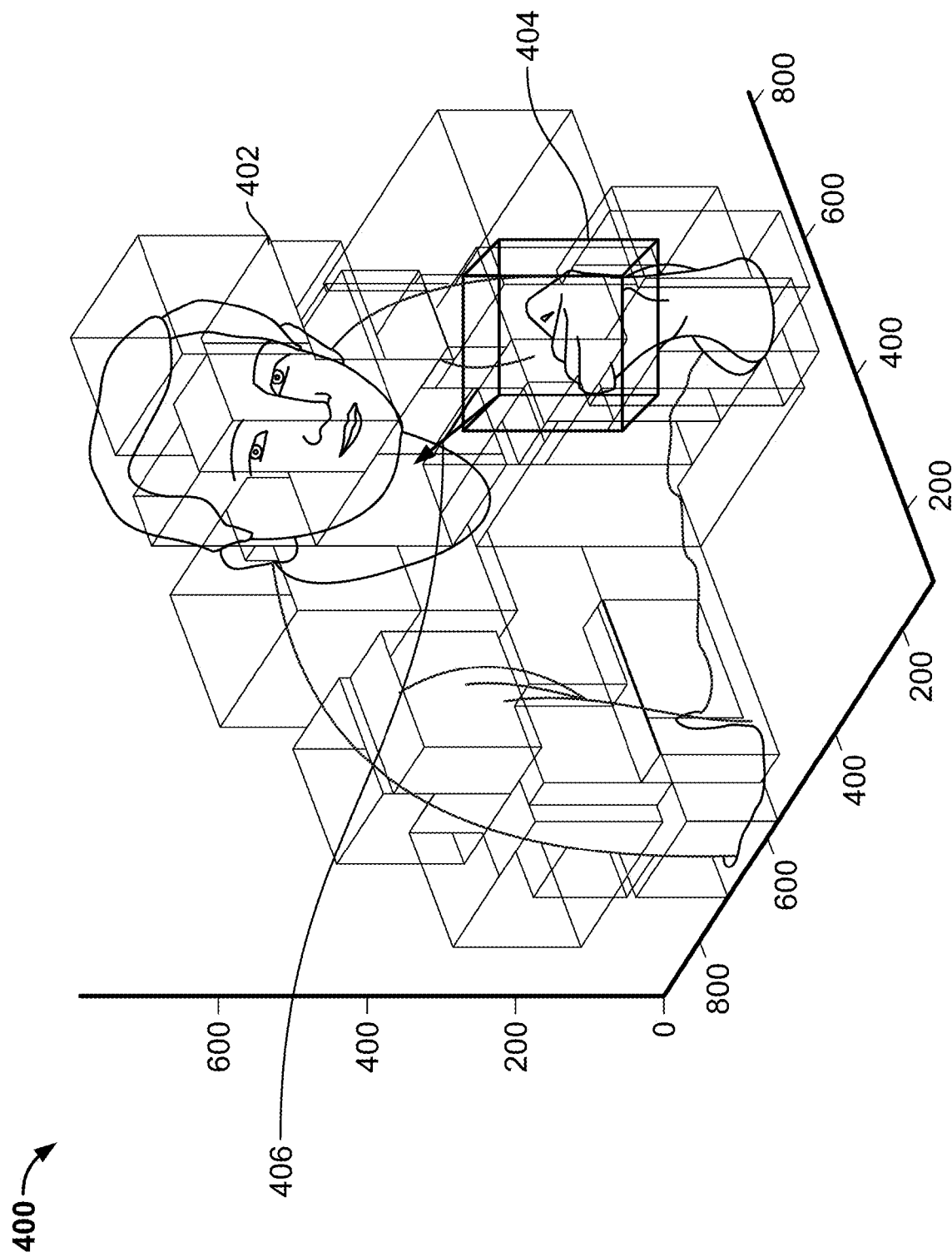
FIG. 4 shows an illustrative example of partitioning point cloud data, in accordance with some embodiments of this disclosure.

FIG. 4 shows an illustrative example 400 of partitioning point cloud data, in accordance with some embodiments of this disclosure. Example 400 may be an example of partitioning the point cloud for a frame. Example 400 shows the point cloud data or sequence. For example, the point cloud data may have been obtained from 3D scanning an individual. The point cloud data may be from a currently viewable frame for a user in an XR context (e.g., through an HMD). The signal represented by the point cloud data may be non-uniformly sampled. Example 400 may illustrate the partitioning of a current frame and/or a reference frame in some embodiments. Example 400 includes a plurality of blocks partitioning the space occupied by the point cloud. The blocks may be non-overlapping. Each block may have a box-like shape and/or different sizes. The blocks may have resulted from an adaptive partitioning, for example, to balance the number of points in each block. Each data point may have associated attributes shown in the example 400 such as a color attribute. For example, block 402 may contain the point cloud portion for an eye of the individual including associated color values for graphically rendering the eye. Block 404 may be a currently selected block having a predicted motion 406. For example, predicted motion 406 may have been determined as a translation of the points corresponding to block 404 using an ICP search. As an illustrative example, the points, or a point cloud portion, corresponding to block 404 may be projected to the frequency domain based on the point geometric affinity as described with respect to FIGS. 1-3. In some aspects, the signal of the point cloud portion may be represented in the frequency domain for block 404. The point cloud attributes of the signal are compressed from the 3D space to a 1D frequency domain for improved encoding efficiency.

Figure 5:
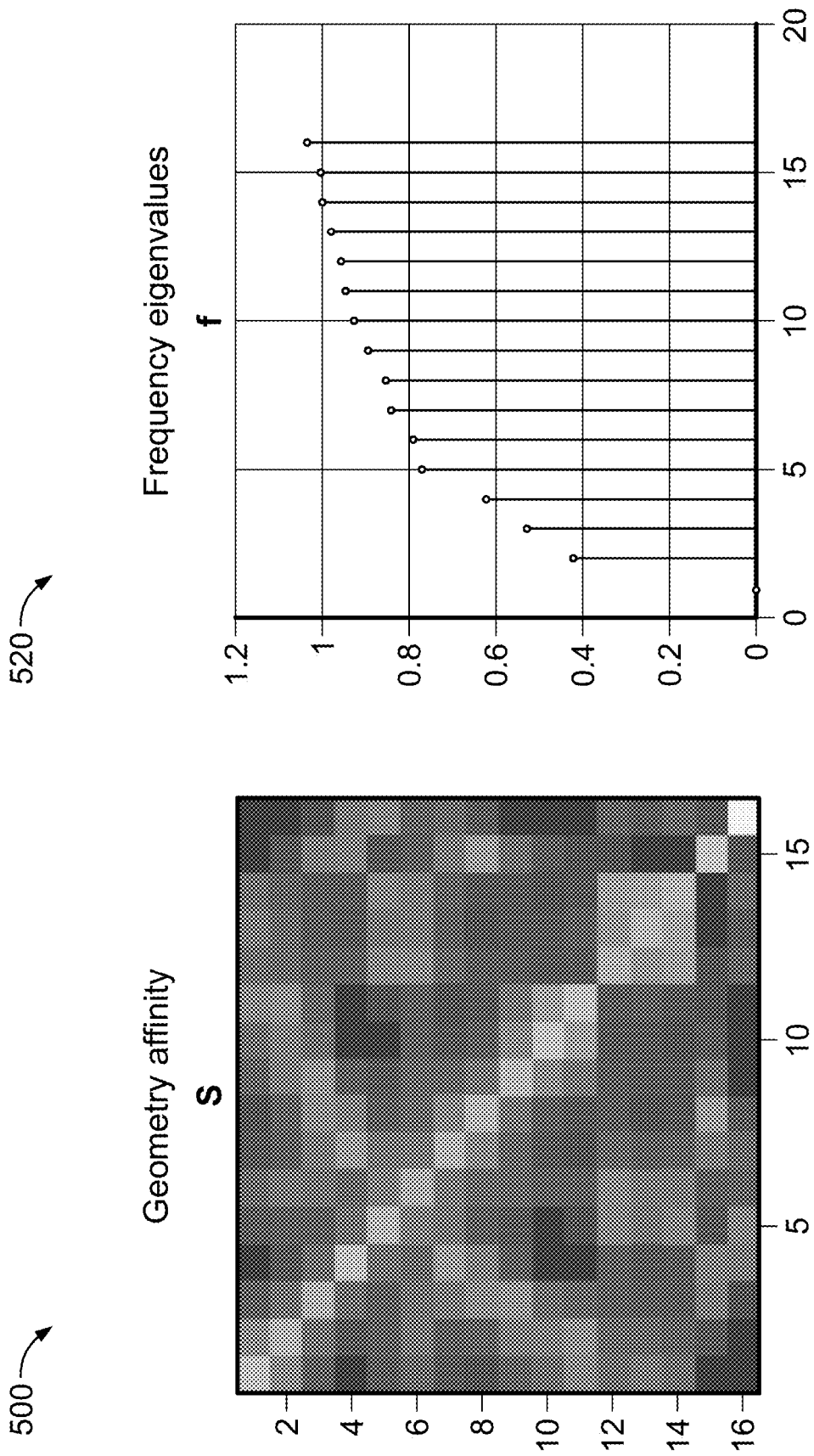
FIG. 5 shows illustrative visualizations of example data structures applied in projecting point cloud data to the frequency domain, in accordance with some embodiments of this disclosure.

FIG. 5 shows illustrative visualizations of example data structures for projecting a point cloud signal to the frequency domain, in accordance with some embodiments of this disclosure. Plot 500 is a visualization of an example geometric affinity matrix S for a block containing 16 points (N=16). The horizontal axis shows the column indices, and the vertical axis shows the row indices of the affinity matrix. The geometric affinity shows that the points closer together or having smaller separation distance have a higher affinity. Plot 520 is a visualization of example eigenvalues and may represent signal sampling points in the frequency domain for a current block. In some aspects, plot 520 shows the projection of the block's signal to the frequency domain. The frequency may be non-uniformly sampled as exhibited in the plot 520. In some embodiments, the residuals may be determined based on the eigenvalues, for example, if a matching block pair has the same number of points. The matching block pair may have the same number of frequency eigenvalues for comparison after the projection.

Figure 6:
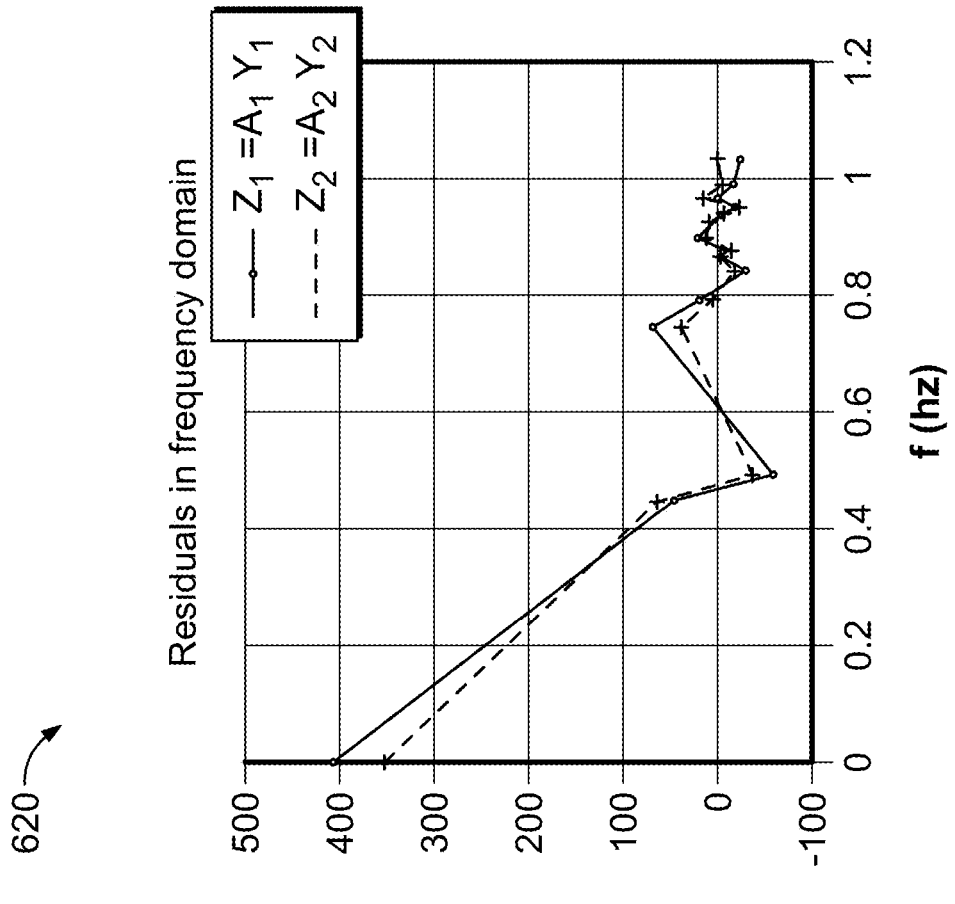
FIG. 6 shows illustrative representations of projected point cloud data in the frequency domain, in accordance with some embodiments of this disclosure.
Figure 6:
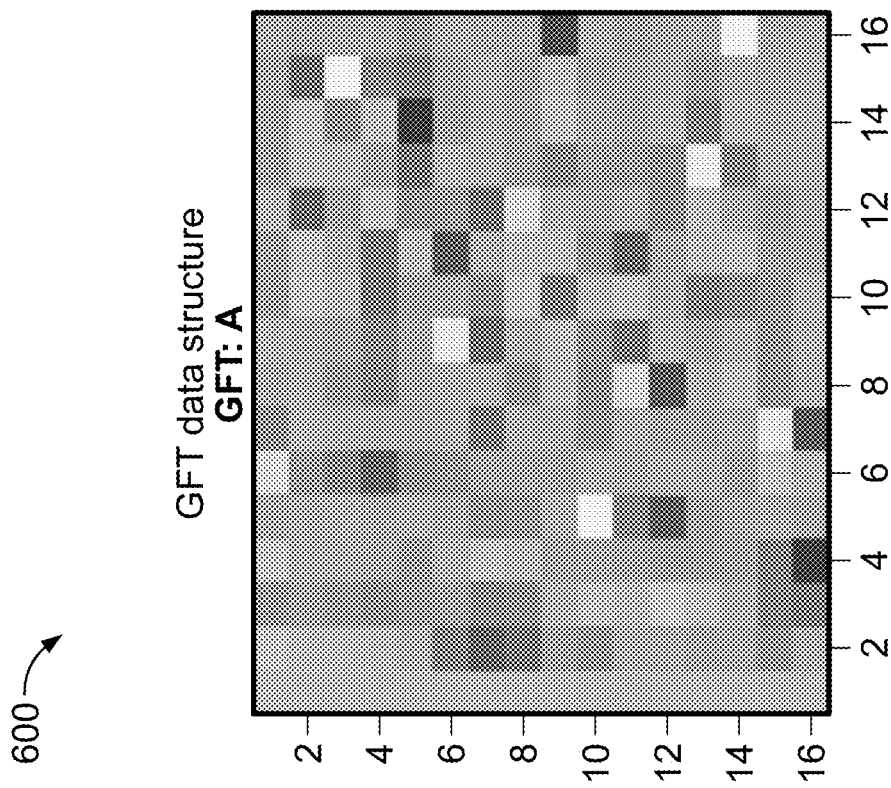

FIG. 6 shows illustrative visualizations of a projected point cloud signal in the frequency domain, in accordance with some embodiments of this disclosure. Plot 600 is a visualization of an example frequency transform matrix A for projecting a block containing 16 points (N=16) to the graph Fourier-transformed domain. The GFT matrix A may be generated by determining the Laplacian eigen solutions based on the affinity matrix S at FIG. 5. In some aspects, the matrix A projects the block's signal and associated attributes from the spatial-temporal domain to the graph Fourier-transformed domain. Plot 620 is a visualization of the projected signal's response (Z=ΔX) sampled at the frequency eigenvalues, for example, shown in the plot 520 at FIG. 5. Plot 620 illustrates a projected signal $z_1$ of a first block having point cloud attributes $y_1$ and similarly for a second block. In some embodiments, the plurality of residuals may be generated based on the response difference ($Z_2-Z_1$) at each sampled point. In some embodiments, the sampled response may be used to generate a parametrization (e.g., a polynomial-based interpolation) of the block's signal in the frequency domain. Plot 620 shows an example linear interpolation connecting the discrete data points to model the signal's response for a matching block pair in the frequency domain. It is noted that any suitable technique may be used to generate a representation or model of the signal in the graph Fourier-transformed domain. An encoder may generate a signal response sampled at selected points based on the parametrization and/or determine the residuals based on the parametrization.

Figure 7:
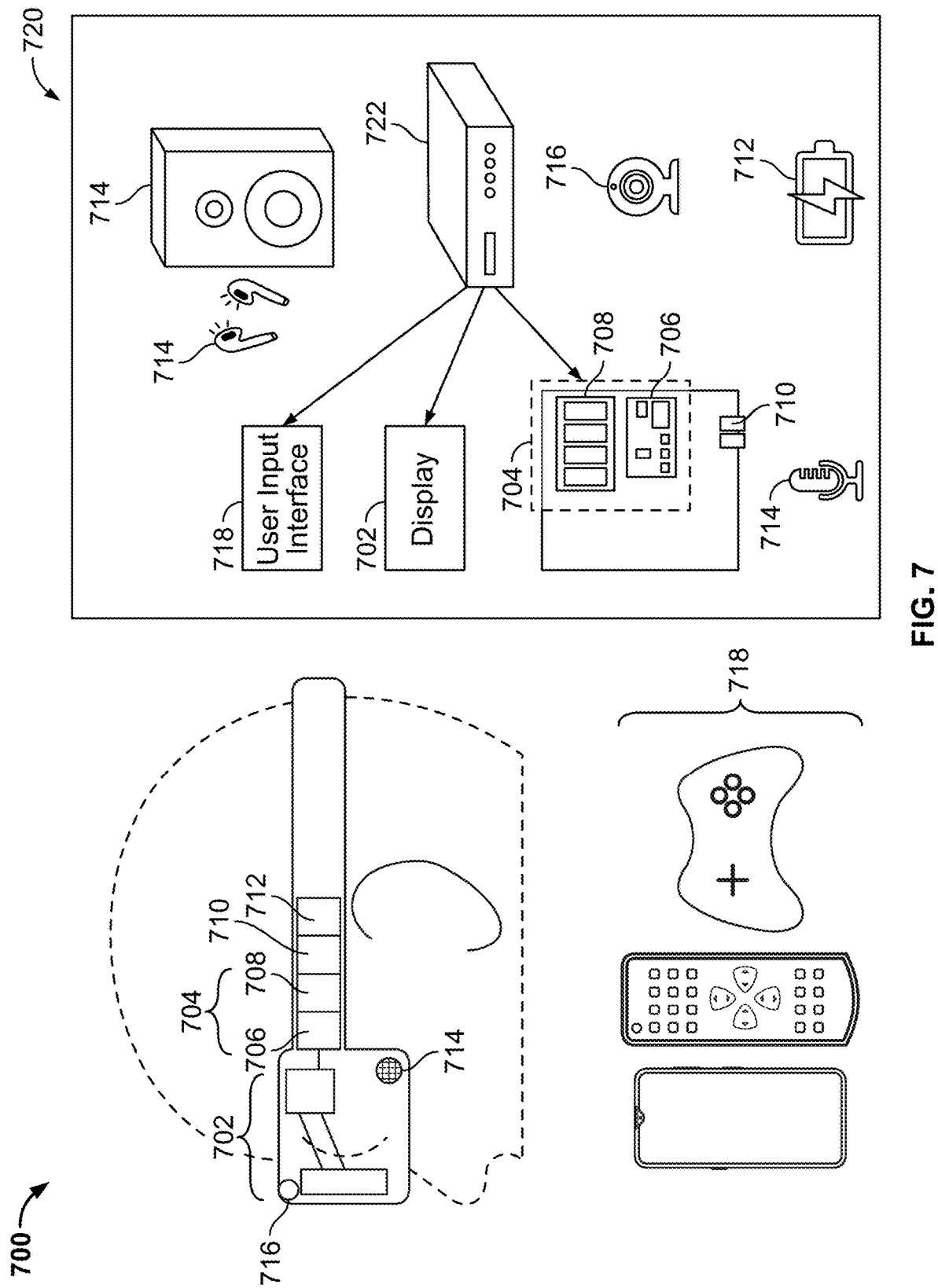
FIG. 7 shows illustrative user equipment for consuming virtual content including an example head-mounted XR device, in accordance with some embodiments of this disclosure.

FIG. 7 shows illustrative user equipment for consuming virtual content including extended reality user equipment 700, in accordance with some embodiments of this disclosure. Equipment 700 may depict an illustrative head-mounted display or any other suitable XR device capable of providing XR content for user consumption. Equipment 700 comprises display 702, control circuitry 704 comprising processor 706 and memory 708, input/output (I/O) path 710, and power source 712. Equipment 700 may comprise integrated audio I/O components 714 and/or camera 716.

Equipment 720 may depict a generalized embodiment of device components that correspond to parts of equipment 700 and/or are coupled to equipment 700. In some embodiments, equipment 700 may be stand-alone or communicatively coupled to a system hub 722. For example, hub 722 may be a set-top box or a gaming console. Any suitable computing device having processing circuitry, control circuitry, and storage may be used in accordance with the present disclosure. For example, hub 722 may include, or be complemented by, a personal computer (e.g., a notebook, a laptop, a desktop), a smartphone, a tablet, a network-based server hosting a user-accessible client device, a non-user-owned device, any other suitable device, or any combination thereof. Equipment 700 may be coupled to external user devices and/or equipment via the hub 722. For example, the hub 722 may be coupled to external audio equipment (e.g., speakers, headphones, and/or microphone 714) and/or camera 716 for supplementing the integrated components of equipment 700.

Each of the user equipment 700 and 720 may access, transmit, receive, and/or retrieve content and data via one or more I/O paths coupled to the respective equipment using corresponding circuitry. As an illustrative example based on equipment 700, I/O path 710 may provide content (e.g., broadcast programming, on-demand programming, Internet content, content available over a local area network (LAN) or wide area network (WAN), and/or other content) and data to control circuitry 704. Control circuitry 704 may be used to send and receive commands, requests, and other suitable data using I/O path 710 and the communication circuitry. I/O path 710 may communicatively couple control circuitry 704 to one or more communication paths. I/O functions may be provided by one or more of these communication paths but may be shown as a single path to avoid overcomplicating the drawing.

Display 702 may comprise an optical system of one or more optical elements such as a lens in front of an eye of a user, one or more waveguides, or an electro-sensitive plane. The display 702 comprises an image source providing an image beam to the optical element. The image beam may be modified (e.g., diffracted) using one or more elements of the optical system. For example, a 3D image may be displayed as output of the optical system in front of the eye of the user at the lens. The display 702 may be a 3D display. Some non-limiting examples of a display include a tensor display, a light field display, a volumetric display, a multi-layer display, an LCD display, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying XR content.

Control circuitry 704 may be based on any suitable control circuitry. Control circuitry 704 may comprise processor 706 and/or memory 708. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. Processor 706 may include video processing circuitry (e.g., integrated and/or a discrete graphics processor). In some embodiments, control circuitry 704 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for an encoding application stored in memory (e.g., memory 708). Specifically, control circuitry 704 may be instructed by the encoding application to perform any of the functions described herein. In some implementations, processing or actions performed by control circuitry 704 may be based on instructions received from the encoding application. Control circuitry 704 may be configured to generate one or more images for display via the device 700 and instruct the optical system to produce one or more image beams corresponding to the one or more images at display 702.

Control circuitry 704 may include or be communicatively coupled to video generating circuitry and tuning circuitry, such as one or more analog tuners, one or more H.265 decoders or any other suitable digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into a suitable output format of user equipment 700. Control circuitry 704 may also include or be communicatively coupled to digital-to-analog converter circuitry and analog-to-digital converter circuitry for converting between digital and analog signals. The tuning and encoding circuitry may be used by user equipment 700 to receive and to display, to play, or to record content. The tuning and encoding circuitry may also be used to receive video encoding/decoding data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided or supplemented by a separate device from user equipment device 700, the tuning and encoding circuitry (including multiple tuners) may be associated with storage 708.

Memory 708 may be any device for storing electronic data, such as random-access memory, solid state devices, quantum storage devices, hard disk drives, non-volatile memory or any other suitable fixed or removable storage devices, and/or any combination of the same. Memory may be an electronic storage device that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Memory 708 may store data defining images for display by the head-mounted display. Memory 708 may be used to store various types of content described herein including XR asset data. Nonvolatile memory may also be used (e.g., to launch a boot-up routine and other instructions). Cloud-based storage may be used to supplement memory 708 or instead of memory 708.

Control circuitry 704 may include or be coupled to communication circuitry suitable for communicating with a server, edge computing systems and devices, a table or database server, or other networks or servers. The instructions for carrying out the above-mentioned functionality may be stored on a server. Such communications may involve the Internet or any other suitable communication networks or paths. In addition, communication circuitry may include circuitry that enables peer-to-peer communication of user equipment devices, or communication of user equipment devices in locations remote from each other. In some embodiments, I/O path 710 comprises circuitry that communicatively couples the head-mounted display to one or more other devices over a network. For example, I/O path 710 may include a network adaptor and associated circuitry. I/O path 710 may comprise wires and/or busses for connecting to a physical network port (e.g., an ethernet port, a wireless WiFi port, cellular communication port, or any other type of suitable physical port). Although communication paths are not shown between user equipment devices, any of the described devices and equipment may communicate directly or indirectly with each other via one or more communication paths and/or communication networks including short-range, point-to-point communication paths, such as USB cables, IEEE 1394 cables, wireless paths (e.g., Bluetooth, infrared, IEEE 702-11x, etc.), or other short-range communication via wired or wireless paths. For example, I/O 710 may include a Bluetooth network adaptor.

Power source 712 comprises a source of power or the interfaces for coupling a power source to the display 702, control circuitry 704, memory 708, and/or network adaptor 710. While not shown, power source 712 may be coupled to other components of equipment 700. Some non-limiting examples of a power source include a battery, solar generator, and/or a wired power source.

Audio I/O equipment 714 may be provided as integrated with other elements of each one of equipment 700, 720 or may be stand-alone units. An audio component of videos and other content may be played through speakers (or headphones) of audio I/O equipment 714. In some embodiments, audio may be distributed to a receiver (not shown), which processes and outputs the audio via speakers of audio I/O equipment 714. In some embodiments, for example, control circuitry 704 is configured to provide audio cues to a user, or other audio feedback to a user, using speakers of audio output equipment 714. There may be a separate microphone and/or audio I/O equipment 714 may include a microphone configured to receive audio input such as voice commands or speech. For example, a user may speak letters or words that are received by the microphone and converted to text by control circuitry 704. As a second example, a user may voice commands that are received by a microphone and recognized by control circuitry 704. Camera 716 may be any suitable video camera integrated with the equipment or externally connected (e.g., via hub 722). Camera 716 may be a digital camera comprising a charge-coupled device (CCD) and/or a complementary metal-oxide semiconductor (CMOS) image sensor. Camera 716 may be an analog camera that converts to digital images via a video card.

In some embodiments, equipment 700 and/or equipment 720 may be communicatively coupled to one or more user input interfaces or devices 718. Some examples of input devices include a remote control, a secondary user device, a touch-sensitive display, a smartphone device, a tablet, a remote control, mouse, trackball, keypad, keyboard, touchscreen, touchpad, stylus input, joystick, voice recognition interface, and/or other user input interfaces. In some embodiments, equipment 700 comprises an integrated user input interface capable of tracking a user's eyes and/or detecting visual and/or audio cues. Equipment 700 may include one or more interface regions for a user to manipulate (e.g., buttons, touch-sensitive bars, etc.). As an example, input interface 718 may include a handheld remote-control device having a microphone and control circuitry configured to receive and identify voice commands and transmit information to equipment 700 directly or via equipment 720.

The encoding application may be implemented using any suitable architecture. For example, it may be a stand-alone application wholly implemented on any of user equipment 700, 720. Instructions of the application may be stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to provide encoding/decoding functionality and perform any of the actions described herein. Based on the processed instructions, control circuitry 704 may determine what action to perform when user input is received. For example, movement of a cursor on a display up/down may be indicated by the processed instructions when input interface 718 indicates that an up/down button was selected.

In some embodiments, the codec application is a client/server-based application. In client/server-based embodiments, control circuitry 704 may include or be coupled to communication circuitry (e.g., I/O 710) suitable for communicating with a server or other networks or servers. The encoding application may be a stand-alone application implemented on a device or a server. The encoding application may be implemented as software or a set of executable instructions. An application and/or any instructions for performing any of the embodiments discussed herein may be encoded on computer-readable media. The computer-readable media may be non-transitory, including, but not limited to, volatile and non-volatile computer memory or storage devices such as a hard disk, floppy disk, USB drive, DVD, CD, media card, register memory, processor cache, random access memory (RAM), a hard drive, random-access memory on a DRAM integrated circuit, read-only memory on a BLU-RAY disk, etc. For example, in FIG. 7, the instructions may be stored in memory 708, and executed by control circuitry 704 of the equipment 700.

Data for use by a thick or thin client implemented on any one of user equipment 700, 720 may be retrieved on demand by issuing requests to a server remote to any one of user equipment 700, 720. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment 700. This way, the processing of the instructions is performed remotely by the server while the resulting displays (e.g., which may include text, a keyboard, or other visuals) are provided locally on equipment 700. Equipment 700 may receive inputs from the user via input interface 718 and transmit those inputs to the remote server for processing and generating the corresponding displays. For example, device 700 may transmit a communication to the remote server indicating that an up/down button was selected via input interface 718. The remote server may process instructions in accordance with that input and generate a display of the application corresponding to the input (e.g., a display that moves a cursor up/down). The generated display is then transmitted to device 700 for presentation to the user.

In some embodiments, the encoding application may be downloaded and interpreted or otherwise run by an interpreter or virtual machine (run by control circuitry 704). In some embodiments, the encoding application may be encoded in the ETV Binary Interchange Format (EBIF), received by control circuitry 704 as part of a suitable feed, and interpreted by a user agent running on control circuitry 704. For example, the encoding application may be an EBIF application. In some embodiments, the encoding application may be defined by a series of JAVA-based files that are received and run by a local virtual machine or other suitable middleware executed by control circuitry 704. In some of such embodiments (e.g., those employing MPEG-2 or other digital media encoding schemes), the encoding application may be, for example, encoded and transmitted in an MPEG-2 object carousel with the MPEG audio and video packets of a program.

FIG. 8 shows an illustrative system 800 for consuming media content, in accordance with some embodiments of this disclosure. System 800 may include components appropriate for encoding and/or decoding of XR content. System 800 may comprise media content source 802, one or more servers 830, and one or more edge servers 840 (e.g., included as part of an edge computing system). System 800 may comprise user equipment devices 820 and/or any other suitable number and types of user equipment capable of transmitting data by way of communication network 810.

In some embodiments, the encoding application may be executed at one or more of control circuitry 831 of server 830 (and/or control circuitry of user equipment devices 820 and/or control circuitry 841 of edge servers 840). The server 830 may be coupled to a database 834. In some embodiments, one or more data structures discussed herein may be stored at the database 834. The data structures may be maintained at or otherwise associated with server 830, and/or at storage 833 and/or at storage of one or more of user equipment devices 820. Communication network 810 may comprise one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 810) may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communications with the client devices may be provided by one or more of these communication paths but may be shown as a single path to avoid overcomplicating the drawing. Although communication paths may not be shown between user equipment devices, the devices may communicate directly with each other via one or more communication paths as well as other short-range, point-to-point communication paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 810.

In some embodiments, the encoding application may be a client/server application where only the client application resides on equipment 700, and a server application resides on an external server. For example, the encoding application may be implemented partially as a client application on control circuitry 704 and partially on server 830 as a server application running on control circuitry 831. Server 830 may be a part of a local area network or may be part of a cloud computing environment accessed via the Internet. In a cloud computing environment, various types of computing services for performing searches on the Internet or informational databases, providing encoding/decoding capabilities, providing storage (e.g., for a database) or parsing data (e.g., using machine learning algorithms described above and below) are provided by a collection of network-accessible computing and storage resources (e.g., server 830 and/or edge server 840), referred to as "the cloud." For example, equipment 700 may be a cloud client that relies on the cloud computing capabilities from server 830 to receive and process encoded data for XR content. When executed by control circuitry of server 830 or 840, the encoding application may instruct control circuitry 831 or 841 to perform processing tasks for equipment 700 and facilitate the encoding/decoding.

In some embodiments, server 830 may include control circuitry 831 and storage 833 (e.g., RAM, ROM, hard disk, removable disk, etc.). Storage 833 may store one or more databases. Server 830 may also include an input/output (I/O) path 832. I/O path 832 may provide encoding/decoding data, device information, or other data, over a local area network (LAN) or wide area network (WAN), and/or other content and data to control circuitry 831, which may include processing circuitry, and storage 833. Control circuitry 831 may be used to send and receive commands, requests, and other suitable data using I/O path 832, which may comprise I/O circuitry. I/O path 832 may connect control circuitry 831 to one or more communications paths.

Edge computing server 840 may comprise control circuitry 841, I/O path 842 and storage 843, which may be implemented in a similar manner as control circuitry 831, I/O path 832 and storage 833, respectively, of server 830. Edge server 840 may be configured to be in communication with one or more of user equipment devices 820 (e.g., devices 821-824) and/or a video server (e.g., server 830) over communication network 810 and may be configured to perform processing tasks (e.g., encoding/decoding) in connection with ongoing processing of video data. In some embodiments, a plurality of edge servers 840 may be strategically located at various geographic locations and may be mobile edge servers configured to provide processing support for mobile devices at various geographical regions.

Control circuitry 831, 841 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 831, 841 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 831, 841 executes instructions for an emulation system application stored in memory (e.g., the storage 833, 843). Although not shown, memory may be an electronic storage device provided as storage 833, 843 that is part of respective control circuitry 831, 841.

Media content source 802, server 830 or edge server 840, or any combination thereof, may include an encoder. The encoder may comprise any suitable combination of hardware and/or software configured to process data to reduce storage space required to store the data and/or bandwidth required to transmit the image data, while minimizing the impact of the encoding on the quality of the media content being encoded. In some embodiments, the data may comprise raw, uncompressed extended reality (3D and/or 4D) media content, or extended reality (3D and/or 4D) media content in any other suitable format. In some embodiments, each of user equipment devices 820 may receive encoded or decoded data locally or over a communication network (e.g., communication network 810) and may comprise one or more decoders. Such a decoder may comprise any suitable combination of hardware and/or software configured to convert data in a coded form to a form that is usable as video signals and/or audio signals or any other suitable type of data signal, or any combination thereof. User equipment devices 820 may be provided with encoded data and may be configured to implement one or more machine learning models to obtain an identifier of an element in a data structure and/or render a color for a particular voxel based on the identified element. In some embodiments, at least a portion of decoding may be performed remote from any of the user equipment devices 820.

The systems and processes described herein are intended to be illustrative and not limiting. One skilled in the art would appreciate that the system components and/or steps of the processes discussed herein may be suitably substituted, omitted, modified, combined and/or rearranged. Components and/or steps may be added without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method for temporally predictive coding of three-dimensional (3D) dynamic point cloud data, the method comprising:

accessing a first frame of 3D point cloud data and a second frame of 3D point cloud data, each 3D point cloud data point comprising 3D spatial coordinates and one or more graphic attributes;

generating a block tree data structure based at least in part on a tree partitioning of the second frame of 3D point cloud data, the block tree data structure comprising a plurality of blocks;

identifying, from the plurality of blocks, a plurality of matching block pairs between the first frame and the second frame based at least in part on block-wise searching of the block tree data structure, wherein each matching block pair comprises a second block of the second frame and a first block of the first frame that matches the second block;

for each matching block pair of the plurality of matching block pairs:

generating frequency-domain representations of a respective first block of the first frame and a respective second block of the second frame via a graph Fourier transform (GFT) algorithm, wherein a first frequency-domain representation of the frequency-domain representations comprises transformed first values of respective 3D spatial coordinates of the respective first block, and wherein a second frequency-domain representation of the frequency-domain representations corresponds to transformed second values of respective 3D spatial coordinates of the respective second block; and determining differences in the frequency-domain representations of the respective first block of the first frame and the respective second block of the second frame, wherein determining differences in the frequency-domain representations comprises determining differences between the transformed first values of the respective 3D spatial coordinates of the respective first block and the transformed second values of the respective 3D spatial coordinates of the respective second block; and generating a bitstream of motion-compensated residuals based at least in part on the determined differences between the transformed first values of the respective 3D spatial coordinates and the transformed second values of the respective 3D spatial coordinates in the frequency-domain representations of the plurality of matching block pairs.

2. The method of claim 1, wherein determining the differences in the frequency-domain representations of the respective first block of the first frame and the respective second block of the second frame comprises:

determining a residual between the frequency-domain representations, wherein the residual represents the differences in the frequency-domain representations; and quantizing the residual.

3. The method of claim 2, wherein generating a bitstream of motion-compensated residuals further comprises generating the bitstream based at least in part on entropy coding the quantized residual.

4. The method of claim 2, further comprising:

for each block of the plurality of blocks of the block tree data structure:

comparing a first encoding cost of the residual and a second encoding cost of a respective block of the second frame; and in response to determining that the second encoding cost is less than the first encoding cost of the respective block, switching from an inter coding mode to an intra coding mode for the respective block.

5. The method of claim 1, wherein generating the block tree data structure comprises partitioning the 3D point cloud data via a binary space partitioning algorithm.

6. The method of claim 5, wherein the binary space partitioning algorithm is a k-dimensional (k-d) tree algorithm.

7. The method of claim 1, wherein identifying the plurality of matching block pairs comprises determining block-wise motion prediction corresponding to the plurality of matching block pairs via an iterative closest point (ICP) algorithm.

8. The method of claim 1, wherein the 3D point cloud data comprises non-uniformly sampled data points.

9. The method of claim 1, wherein the one or more graphic attributes comprise one or more of additive color components, subtractive color components, chrominance components, or luminance components.

10. The method of claim 1, wherein the bitstream of motion-compensated residuals is generated based at least in part on differences in the one or more graphic attributes of the plurality of matching block pairs.

11. A system for temporally predictive coding of three-dimensional (3D) dynamic point cloud data, the system comprising:

communication circuitry configured to transmit and retrieve content; and control circuitry configured to:

access, via the communication circuitry, a first frame of 3D point cloud data and a second frame of 3D point cloud data, each 3D point cloud data point comprising 3D spatial coordinates and one or more graphic attributes;

generate a block tree data structure based at least in part on a tree partitioning of the second frame of 3D point cloud data, the block tree data structure comprising a plurality of blocks;

identify, from the plurality of blocks, a plurality of matching block pairs between the first frame and the second frame based at least in part on block-wise searching of the block tree data structure, wherein each matching block pair comprises a second block of the second frame and a first block of the first frame that matches the second block;

for each matching block pair of the plurality of matching block pairs:

generate frequency-domain representations of a respective first block of the first frame and a respective second block of the second frame via a graph Fourier transform (GFT) algorithm, wherein a first frequency-domain representation of the frequency-domain representations comprises transformed first values of respective 3D spatial coordinates of the respective first block, and wherein a second frequency-domain representation of the frequency-domain representations corresponds to transformed second values of respective 3D spatial coordinates of the respective second block; and determine differences in the frequency-domain representations of the respective first block of the first frame and the respective second block of the second frame, wherein determining differences in the frequency-domain representations comprises determining differences between the transformed first values of the respective 3D spatial coordinates of the respective first block and the transformed second values of the respective 3D spatial coordinates of the respective second block; and generate a bitstream of motion-compensated residuals based at least in part on the determined differences between the transformed first values of the respective 3D spatial coordinates and the transformed second values of the respective 3D spatial coordinates in the frequency-domain representations of the plurality of matching block pairs.

12. The system of claim 11, wherein the control circuitry, when determining the differences in the frequency-domain representations, is configured to:

determine a residual between the frequency-domain representations, wherein the residual represents the differences in the frequency-domain representations; and quantize the residual.

13. The system of claim 12, wherein the control circuitry is further configured to generate the bitstream based at least in part on entropy coding the quantized residual.

14. The system of claim 12, wherein the control circuitry is further configured to:
   for each block of the plurality of blocks of the block tree data structure:
      compare a first encoding cost of the residual and a second encoding cost of a respective block of the second frame; and
      in response to determining that the second encoding cost is less than the first encoding cost of the respective block, switch from an inter coding mode to an intra coding mode for the respective block.

15. The system of claim 11, wherein the control circuitry, when generating the block tree data structure, is configured to partition the 3D point cloud data via a binary space partitioning algorithm.

16. The system of claim 15, wherein the binary space partitioning algorithm is a k-dimensional (k-d) tree algorithm.

17. The system of claim 11, wherein the control circuitry, when identifying the plurality of matching block pairs, is configured to determine block-wise motion prediction corresponding to the plurality of matching block pairs via an iterative closest point (ICP) algorithm.

18. The system of claim 11, wherein the 3D point cloud data comprises non-uniformly sampled data points.

19. The system of claim 11, wherein the one or more graphic attributes comprise one or more of additive color components, subtractive color components, chrominance components, or luminance components.

20. The system of claim 11, wherein the control circuitry is configured to generate the bitstream of motion-compensated residuals based at least in part on differences in the one or more graphic attributes of the plurality of matching block pairs.

* * * * *